(12) United States Patent
Goldberg et al.

(10) Patent No.: US 6,529,657 B2
(45) Date of Patent: Mar. 4, 2003

(54) ANGLE SELECTIVE SIDE-PUMPING OF FIBER AMPLIFIERS AND LASERS

(75) Inventors: Lew Goldberg, Fairfax, VA (US); Marc LeFlohic, Saint Quey Perros (FR)

(73) Assignee: Keopsys, Inc., Fairfax, VA (US)

(*) Notice: Subject to any disclaimer, the term of this patent is extended or adjusted under 35 U.S.C. 154(b) by 98 days.

(21) Appl. No.: 09/790,614

(22) Filed: Feb. 23, 2001

(65) Prior Publication Data

US 2002/0118918 A1 Aug. 29, 2002

(51) Int. Cl.[7] .................................................. G02B 6/42
(52) U.S. Cl. ............................... 385/31; 385/49; 385/88; 385/123; 385/33; 372/6
(58) Field of Search ............................. 385/81, 49, 88, 385/123, 32; 372/6

(56) References Cited

U.S. PATENT DOCUMENTS

| | | | |
|---|---|---|---|
| 4,815,079 A | | 3/1989 | Snitzer et al. ............... 372/6 |
| 5,031,984 A | * | 7/1991 | Eide et al. .................. 385/15 |
| 5,037,172 A | * | 8/1991 | Hekman et al. ............ 385/123 |
| 5,854,865 A | | 12/1998 | Goldberg ..................... 385/31 |
| 6,058,228 A | * | 5/2000 | Fasanella et al. ............ 385/16 |

OTHER PUBLICATIONS

Shuji Mononobe, et al., "Fabrication of a Pencil-Shaped Fiber Probe for Near-Field Optics by Selective Chemical Etching", Journal of Lightwave Technology, vol. 14, No. 10, Oct. 1996, p.p. 2231–2235.

J. D. Minelly, et al., "Efficient Cladding Pumping of an Er3+ Fibre", Proc. 21st Eur. Conf. on Opt. Comm, ECOC 1995, p.p. 917–920.

P. Bousselet, et al., "+ 26 dBm Output Power From An Engineered Cladding–Pumped Yb–Free EDFA for L–Band WDM Applications", Alcatel Corporate Research Centre, OFC 2000, p.p. 114–116.

Piotr Myslinski, et al., "Effects of Concentration on the Performance of Erbium–Doped Fiber Amplifiers", Journal of lightwave technology, vol. 15, No. 1, Jan. 1997, p.p. 112–119.

J.E. Townsend, et al., "yb3+ Sensitised Er3+ Doped Silica Optical Fibre With Ultrahigh Transfer Efficiency and Gain", Electronics letters, Oct. 10, 1991, p.p. 1958–1959.

Martin E. Fermann, et al., "Single–Mode Excitation of Multimode Fibers With Ultrashort Pulses", Optics Letters, vol. 23, No. 1, Jan. 1, 1998, p.p. 52–54.

* cited by examiner

*Primary Examiner*—Robert H. Kim
*Assistant Examiner*—George Wang
(74) *Attorney, Agent, or Firm*—Dorsey & Whitney LLP

(57) ABSTRACT

A method and apparatus of coupling pump light from an extended source to an optical waveguide is disclosed. The coupling is preferably achieved through the use of a v-groove in the optical waveguide and an angle-selective mechanism that enables the angular distributions of the pump light to be optimized for optimal coupling via facets of the v-groove. Embodiments of the apparatus use a wedge, a double wedge, mirrors, or composite lenses to affect the angle selection of the pump light.

62 Claims, 13 Drawing Sheets

End view

ANGLE SELECTIVE SIDE-PUMPING OF FIBER AMPLIFIERS AND LASERS

FIELD OF THE INVENTION

The present invention relates to fiber optics, and more particularly to high power fiber amplifiers and lasers and devices for optically pumping these in order to create a population inversion within an active medium of such amplifiers and/or lasers.

BACKGROUND OF THE INVENTION

Double cladding fiber structures have been demonstrated to be an effective approach of constructing high power fiber lasers and amplifiers. See L. Goldberg et al., "Highly efficient 4-W Yb-doped fiber amplifier pumped by a broad stripe laser diode," Optics Letters, v. 15, pp. 673–675, 1999. Since the typical inner cladding dimension of a double cladding fiber structure is 100–250 µm, non-diffraction emission from high power broad area laser diode pumps can be efficiently coupled into such fibers. A 100 µm wide broad stripe laser diode can generate an output power of 2–4 W at 810 nm, 915 nm or 980 nm with a long operating life. Larger pump powers required for building high power fiber amplifiers can be realized using multiple broad stripe pump diodes, coupled through a plurality of v-grooves in the double cladding fiber structure.

A broad stripe laser diode generates a beam that is diffraction limited in the plane perpendicular to the diode junction, and that emerges from a region approximately 1 µm wide at the diode facet. In this plane, diode emission exhibits a relatively large beam divergence of 30°–40° (full width at half-maximum of the intensity ("FWHM")). On the other hand, in the plane parallel to the diode junction, the emission emerges from an extended region of 100 µm (equal to the width of the active stripe), diverges with an angle of 10°–12° (FWHM), and is characterized by low spatial coherence.

Another approach for increasing the available pump power is through the use of a fiber-coupled pump diode bar. Such diode bars are typically 1 cm wide and contain 10 to 40 of 100–200 µm wide emitting stripes, resulting in a total output power of 20–60 W. The emission of the 1 cm wide diode bar can be collected and coupled into a multimode delivery fiber with a typical numerical aperture of 0.1–0.3 and a diameter of 200 µm to 400 µm. The output of such a multimode fiber constitutes a low spatial coherence extended source, emitting a beam that cannot be focused into a diffraction-limited spot.

The v-groove technique, see U.S. Pat. No. 5,854,865 to Goldberg et al., entitled "Method and Apparatus For Side-Pumping An Optical Fiber," for coupling pump light from a broad stripe laser diode into the inner cladding of a double cladding fiber is illustrated in FIGS. 1a—1b. As shown in FIGS. 1a—1b, a 90° v-groove extends nearly to the fiber core, the broad stripe laser diode is oriented so that its junction is perpendicular to the fiber axis, and the inner cladding is square shaped.

For the diode-fiber orientation of FIGS. 1a—1b, pump light emerging from the diode diverges as it propagates toward the v-groove so that the radiation emitted to the right of the junction impinges on the right facet (facet 1) of the v-groove, while radiation emitted to the left impinges the left facet (facet 2). Each of the facets reflects the impinging light and directs it along the fiber. The inner cladding captures and guides any pump light reflected by the v-groove facet if that light is launched at angles $\theta_L$ (measured outside of the fiber, relative to the fiber axis) equal or smaller than the critical angle $\theta_c$, related to the numerical aperture of the cladding by $NA = \sin \theta_c$. For a typical double cladding fiber, the inner cladding numerical aperture is 0.4–0.5, corresponding to a maximum launch angle (measured outside of the fiber) of $\theta_L = 24°–30°$. FIG. 1c illustrates angle space plots for the v-groove coupling. In these plots, a circle represents the acceptance angle of the inner cladding, since the inner cladding, regardless of pointing direction, captures rays incident at any angle below θc.

Light incident on v-groove facets at angles smaller than the critical angle for the glass-air interface of the facet undergoes total internal reflection ("TIR"). For silica glass with a refractive index of 1.46, the critical angle is 47° inside the fiber, measured relative to the glass surface. This means that inside the fiber all rays incident from the left side of the vertical or within 2 degrees on the right side of the vertical undergo TIR at the facet. From Snell's law, the steepest (relative to the v-groove facet) angle of incidence outside of the fiber is approximately 3 degrees. Therefore, light which is incident on the right facet (facet 1) in FIG. 1a undergoes TIR for angles θy ranging from −3° (rays traveling to the left of the vertical) to all positive angles (rays traveling to the right of the vertical). Similarly, light incident on the left facet undergoes TIR for all angles $\theta_y$ ranging from +3° to all negative angles. Since diode emission in the yz plane in FIG. 1a is effectively bisected by the vertical line projected from the v-groove apex to the diode junction, pump light impinges on the right facet only at positive angles, while it impinges on the left facet only at negative angles, as shown.

Why the pump light impinges on the right facet only at positive angles, while it impinges on the left facet only at negative angles is explained by FIG. 1c. In FIG. 1c, the shaded area above the $\theta_x$-axis depicts the angular coverage of facet 1, showing that all positive diode emission angles $\theta_y$ are TIR reflected by facet 1 and are captured by the fiber. Similarly, the shaded area below the $\theta_x$-axis of FIG. 1c shows that all negative diode emission angles $\theta_y$ are TIR reflected by facet 2 and are captured by the fiber. Therefore, all light emitted by the diode undergoes TIR at the v-groove facets. The combined angular coverage provided by the two facets allows efficient coupling of the light from the broad stripe laser into the inner cladding of the double cladding fiber. This is only possible because in the yz plane, the diode emission originates from a very small area (approximately 1 µm) so that a vertical line through the v-groove apex and the diode junction effectively bisects the diode emission's angular divergence.

Unfortunately, the above-described method of coupling pump light into a double cladding fiber does not function well when an extended pump source, such as a multimode fiber is used, as shown in FIG. 2a. Here the light incident on facet 1 or facet 2 contains the full angular distribution of the pump fiber output. As shown in FIG. 2b, the angular distribution is uniform in all directions and extends up to the critical angle of the pump delivery fiber. Since TIR reflection at the v-groove facet occurs only for one half of this distribution (positive angles for facet 1, and negative angles for facet 2), a substantial fraction of the incident power will be transmitted through the facet-air interface.

SUMMARY OF THE INVENTION

The present invention is a method and apparatus for constructing high power fiber amplifiers and lasers. Embodiments of the present invention provide a means for efficient pumping of fiber amplifiers and lasers that make use of double cladding fibers. Embodiments of the present invention are designed to work in conjunction with a v-groove coupling technique for injecting the pump light from an extended pump source into the inner cladding of a double cladding fiber.

In v-groove coupling, when pump light is incident on v-groove facets over a limited angular range, the pump light is reflected by TIR at the facet-to-air interface and directed into the fiber. An embodiment of present invention comprises an apparatus and method for efficiently v-groove coupling a pump light emerging from an extended pump source, such as a multimode fiber, into a double cladding fiber. This apparatus and method preferably utilize an optical system that separates the pump beam into two beams, each with approximately one half of the angular divergence of the original beam. The angular and spatial distributions of the transformed pump beam make it possible for it to efficiently couple into the double cladding fiber through a v-groove using TIR.

An advantage of the present invention is that it provides a means for efficient coupling of light from extended pump sources into double cladding fibers through v-grooves, without using high reflectivity coating on the v-groove facets.

Embodiments of the present invention comprise an apparatus for efficiently coupling light from a spatially extended pump source through a v-groove into an optical waveguide, the apparatus comprising: a pump source that emits a source beam when in operation, wherein the source beam comprises a plurality of source rays; an optical system, wherein the source beam traverses the optical system and the optical system separates the source beam into a first pump beam and a second pump beam with different angular distributions, the optical system comprising: a first lens that collects the source rays of the source beam; and a second lens that focuses the collected source rays into the first pump beam and the second pump beam; and an optical waveguide, comprising a v-groove, wherein the v-groove comprises a first facet, a second facet and an apex and the v-groove extends into the optical waveguide, and wherein the first pump beam is incident on the first facet and the second pump beam is incident on the second facet and the v-groove couples the first pump beam and the second pump beam into the optical waveguide.

Embodiments of the present invention comprise an apparatus for efficiently coupling light from a spatially extended pump source through a v-groove into a fiber, the apparatus comprising: a pump source that emits a source beam when in operation, wherein the source beam comprises a plurality of source rays; an optical system, wherein the source beam traverses the optical system and the optical system collects and focuses the source rays of the source beam, the optical system comprising: means for separating the source beam into a first pump beam and a second pump beam with different angular distributions; and a fiber, comprising a v-groove, wherein the v-groove comprises a first facet, a second facet and an apex and the v-groove extends into the fiber, and wherein the first pump beam is incident on the first facet and the second pump beam is incident on the second facet and the v-groove couples the first pump beam and the second pump beam into the fiber.

BRIEF DESCRIPTION OF THE FIGURES

The detailed description will refer to the following drawings, in which like numbers refer to like items, and in which:

FIG. 2b is an angle space plot of the emission angles of the diode bar or multiple laser diode of FIG. 2a.

FIG. 3b is a top view of a v-groove in a double-cladding fiber pumped by the optical system of FIG. 3a.

FIG. 6b is a side view illustrating construction of the split composite collection lens of FIG. 6a.

DETAILED DESCRIPTION OF THE INVENTION

The present invention preferably provides a means for efficiently coupling light from a spatially extended pump source into the inner cladding of a double cladding fiber through a v-groove. The extended pump source may be, for example, a multimode fiber, a multimode laser diode, a multimode solid-state laser, a pump beam comprising a plurality of optically stacked laser diode emission areas (for example, see W. A. Clarkson, D. C. Hanna, "Two-Mirror Beam-Shaping Technique For High Power Diode Bars", v. 21, p. 375, 1996), or a beam which is generated by focusing the emission of a diode bar into a small (much smaller than the original 1 cm width of the diode bar) spot. Preferably, the methods and apparatus discussed herein function by splitting the extended pump sourcebeam into two spatially separate beams, one containing only the positive $\theta_y$ emission angles, the other containing only the negative $-\theta_y$ emission angles. Preferably, each of these two beams is incident on one of the two v-groove facets in a way that results in TIR reflection for each beam, and efficient coupling of both beams into the double cladding fiber.

Figure 1A:
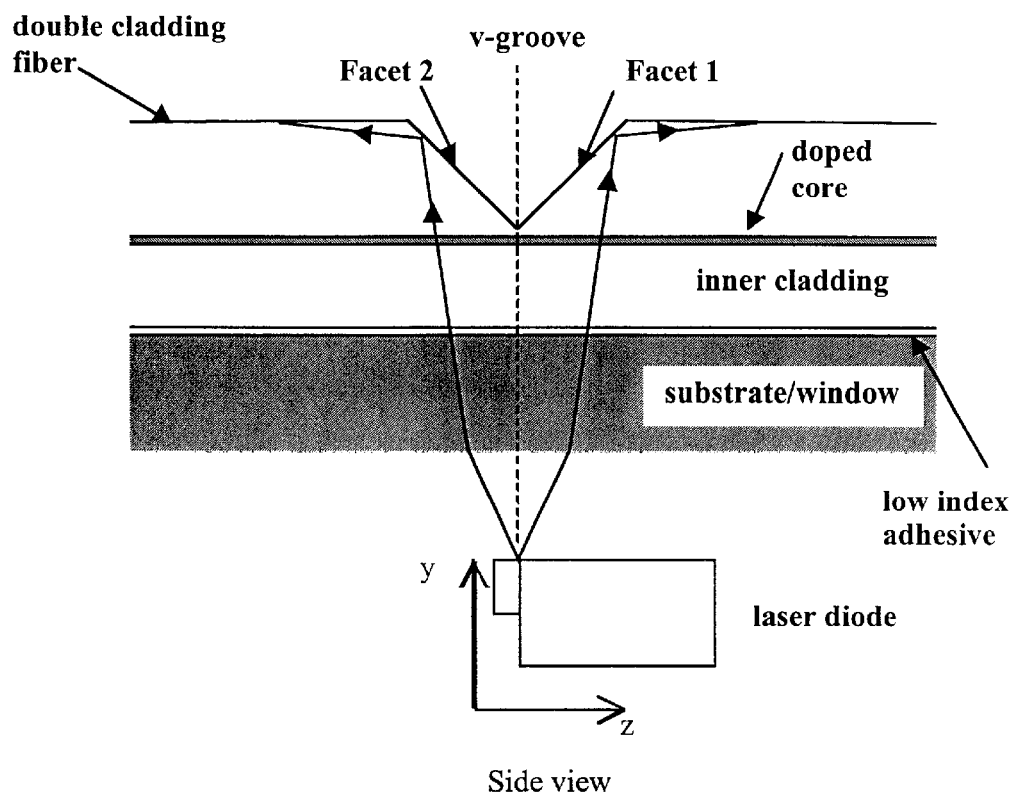
FIG. 1a is a cross-sectional side view of a laser diode side-pumped double-cladding fiber with a v-groove.
Figure 1B:
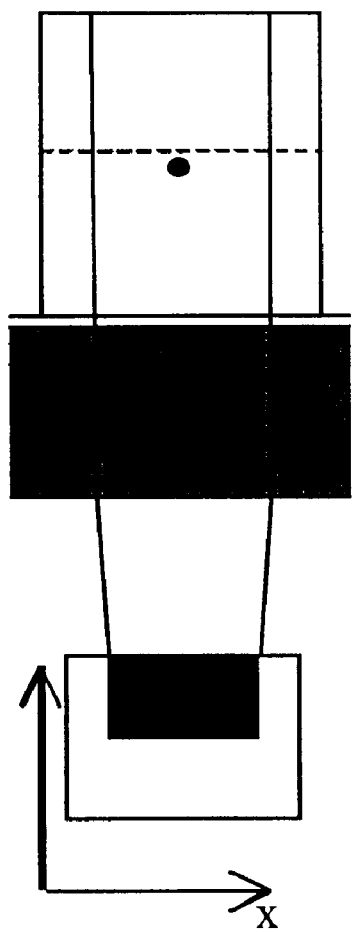
FIG. 1b is a cross-sectional end view of a laser diode side-pumped double-cladding fiber with a v-groove.
Figure 1C:
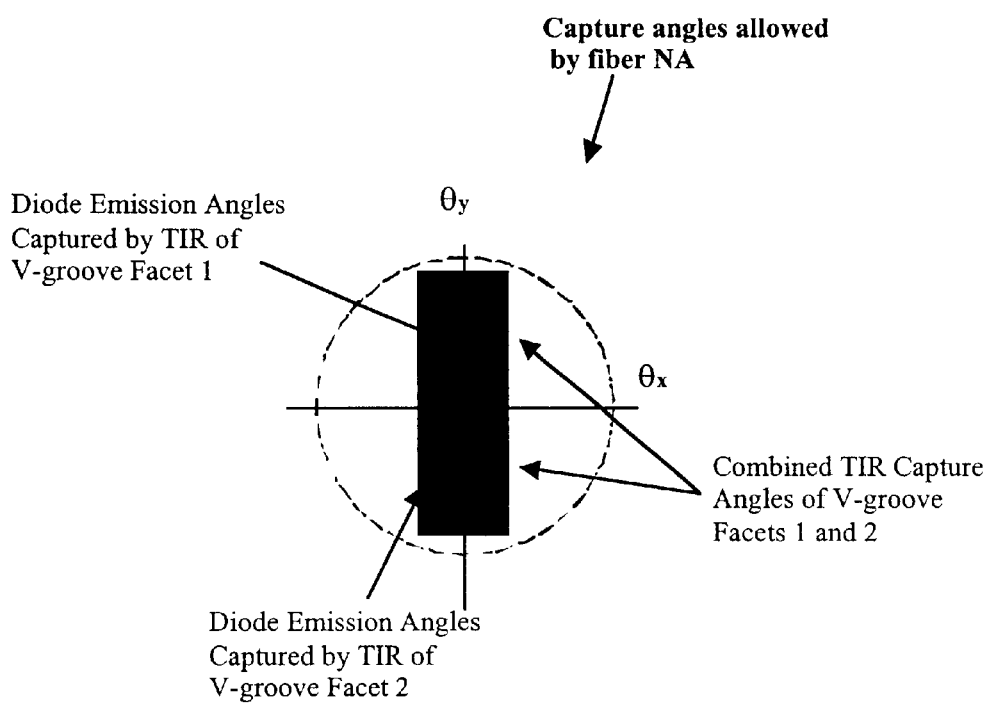
FIG. 1c is an angle space plot of the emission angles TIR captured by both facets of the v-groove of the side-pumped double-cladding fiber shown in FIGS. 1a—1b.
Figure 2A:
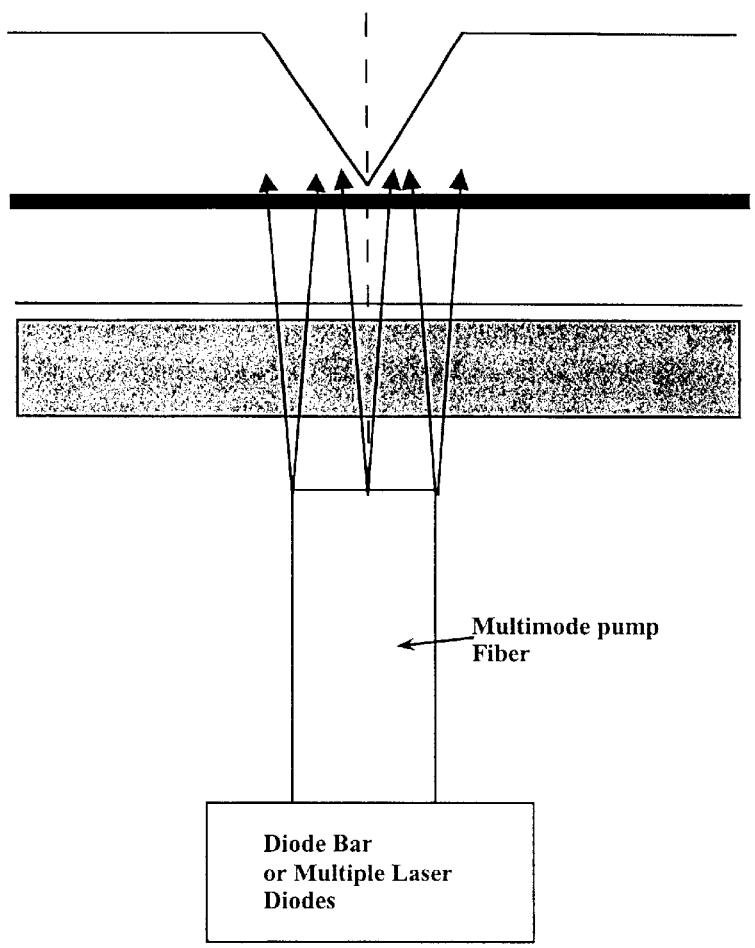
FIG. 2a is a cross-sectional side view of a diode bar or multiple laser diode side-pumped double-cladding fiber with a v-groove.
Figure 2B:
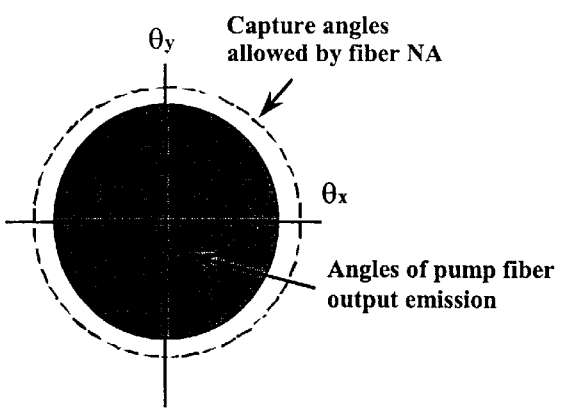
Figure 3A:
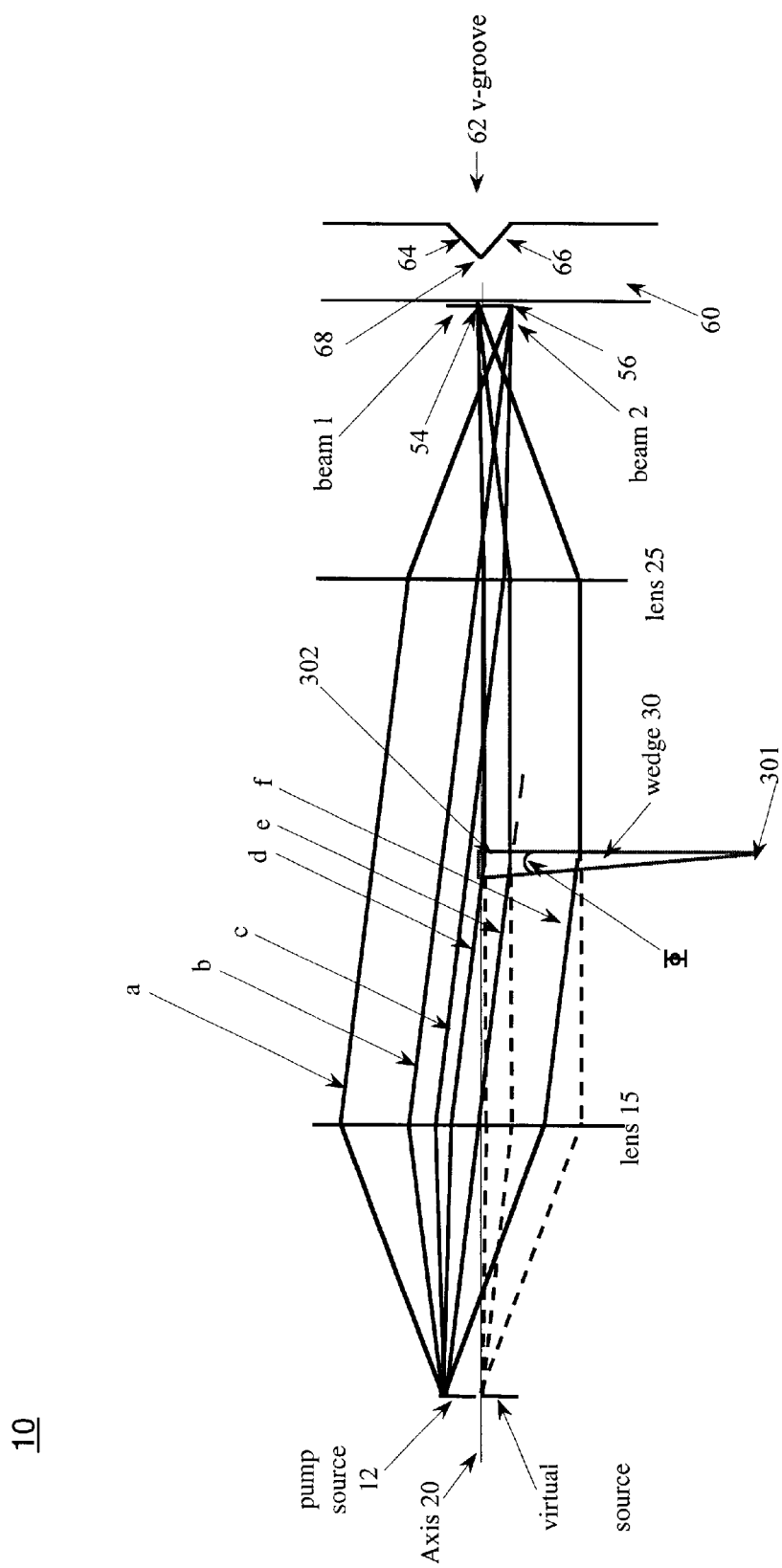
FIG. 3a is a side view of an optical system with a single wedge according to an embodiment of the present invention.

FIGS. 3a—d illustrate a method and apparatus according to an embodiment of the present invention. The embodiment shown includes a single wedge optical system 10 for generating two beams with correct angular divergence properties for v-groove pumping a double-cladding fiber with a spatially extended pump source. The optical systems discussed herein generally include two lenses that are arranged to form an image of the pump source beam and a means for splitting the pump source beam into two spatially separate beams (e.g., wedge between the lenses). In FIG. 3a, the optical system 10 comprises a first lens 15, a second lens 25 and a wedge 30, and is arranged with a pump source 12 and a double-cladding fiber 60 with a v-groove 62, the v-groove 62 comprising a first facet 64, a second facet 66 and an apex 68.

The first lens 15, having a focal length f1, collects the light from the pump source 12. The second lens 25, having a focal length f2, focuses the collected pump source light to form an image of the pump source beam. In a preferred embodiment, the first lens 15 and the second lens 25 are arranged as a telescope with their separation equal to f1+f2. In this arrangement the extended pump source 12 can be placed in the focal plane of the first lens 15, so that the image of the pump source beam is formed in the back focal plane of the second lens 25. The focal lengths f1 and f2 may be chosen to optimize the imaged pump source beam size and its divergence. The pump source beam image de-magnification (or magnification) factor M is given by M=f2/f1 and the pump source beam image divergence, relative to the divergence of the pump source, changes by a factor 1/M.

The wedge 30 is preferably placed in the back focal plane of the first lens 15 (which coincides with the front focal plane of the second lens 25). As seen in FIG. 3a, the wedge 30 comprises a narrow end 301 and a wide end 302 with a divergence defined by a wedge angle $\Phi$. The wedge 30 is oriented so that its wide end 302 is near an optical axis 20 of the optical system 10.

For sake of clarity, FIG. 3a only depicts certain of the light rays (a—f) of the pump source beam that originate from a single source point of the pump source 12. The pump source beam comprises a multitude of lights rays that originate from the full width w of the pump source 12. In FIG. 3a, the source point illustrated is at the "top" of the pump source 12; in the other embodiments discussed below, the source point chosen is in the middle of the pump source 12. In the arrangement shown in FIG. 3a, light rays (a—f) originating from any source point in the pump source 12 form a set of parallel rays after traversing the first lens 15. The angle between these parallel rays and the optical axis 20 is given by $\theta$=y/f1 (not shown), where y is the distance from the source point to the optical axis 20. In an optical system without the wedge 30, these rays would form an image point at a vertical position y'=-$\theta$f2, after traversing the second lens 25 (using paraxial approximation); in the optical system 10 shown, only rays a—c are focused at an image point at a vertical position y'=-$\theta$f2.

Rays (a—c in FIG. 3a) emanating from the pump source 12 at positive angles bypass the wedge 30 and propagate unimpeded between the first lens 15 and the second lens 25. Rays (d—f in FIG. 3a) emanating from the pump source 12 at negative angles pass through the wedge 30 and are deflected in the upward direction (toward the optical axis 20) by an angle $\Delta\theta=\Phi(n-1)$, where n is the refractive index of the wedge material and the wedge angle $\Phi$ is assumed to be small (e.g., 1–10 degrees). This change (i.e., the deflection angle $\Delta\theta$) in the propagation angle for the negative angle source rays d—f produces an upward shifted source beam image 54 in the back focal plane of the second lens 25, as shown in FIG. 3a. The deflected rays d—f can also be considered to be generated by a virtual source 12' located by tracing (as indicated by the dashed lines in FIG. 3a) the deflected rays back to the front focal plane of the first lens 15.

Figure 3B:
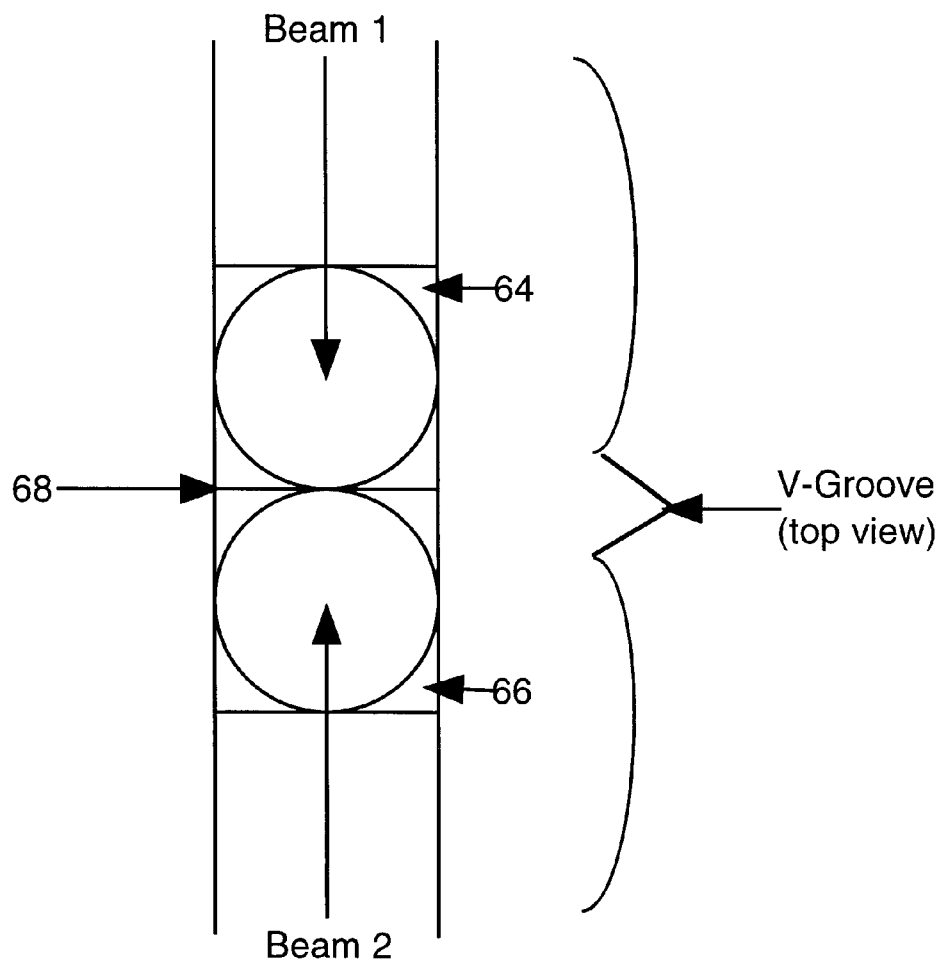

The positive angle source rays a—c form a second, un-shifted source beam image 56 in the back focal plane of the second lens 25, as seen in FIG. 3a. Preferably, the two beam images 54, 56 are approximately separated by the distance y from the source point to the optical axis 20, so that the two beam images 54, 56 have only small or no spatial overlap. Collectively, the beam images formed by the optical system 10 from the negative angle source rays originating from the full width of the pump source 12 form beam 1, as seen in FIGS. 3a and 3b. Likewise, the beam images formed by the optical system 10 from the positive angle source rays originating from the full width of the pump source 12 form beam 2, as seen in FIGS. 3a and 3b. In other words, the optical system 10 splits the pump source beam into two beams, beam 1 and beam 2, which evenly distribute the intensity of the pump source beam. For a circularly shaped extended pump source 12, such as a multimode fiber, the two beam intensity distribution minimizes power falling on the v-groove apex 68, thus reducing pump losses caused by light transmission through that region.

The magnitude $\Delta_y$ of the vertical shift in the source beam image 54 produced by the negative angle rays d—f is given by $\Delta_y=\Delta\theta$f2. Using as an example a 200 $\mu$m diameter pump delivery fiber, with lens focal lengths of f1=f2=5 mm, and a wedge 30 made of glass with n=1.5, abeam separation (i.e., the separation between the positive angle ray source beam image 56 and the negative angle ray source beam image 54) equal to the fiber diameter requires a wedge angle of $\Phi$=4.6°. The wedge's 30 surfaces may be antireflection coated to reduce reflective losses.

Another important property of the optical system 10 of FIG. 3a is that the un-shifted image 56 produced by the positive angle source rays a—c (and thus, the beam 2) preferably contains only negative angle $-\theta_y$ (with respect to the image spot 56) rays, while the shifted image 54 produced by the negative source rays d—f (and thus, the beam 1) preferably contains only positive angle $\theta_y$ (with respect to the image spot 54) rays, with respect to an axis at the midpoint between the two images 54, 56. Therefore, the optical system 10 produces angular as well as spatial differentiation of the images 54, 56 formed from the positive angle source rays ac and the negative angle source rays d—f.

Figure 3C:
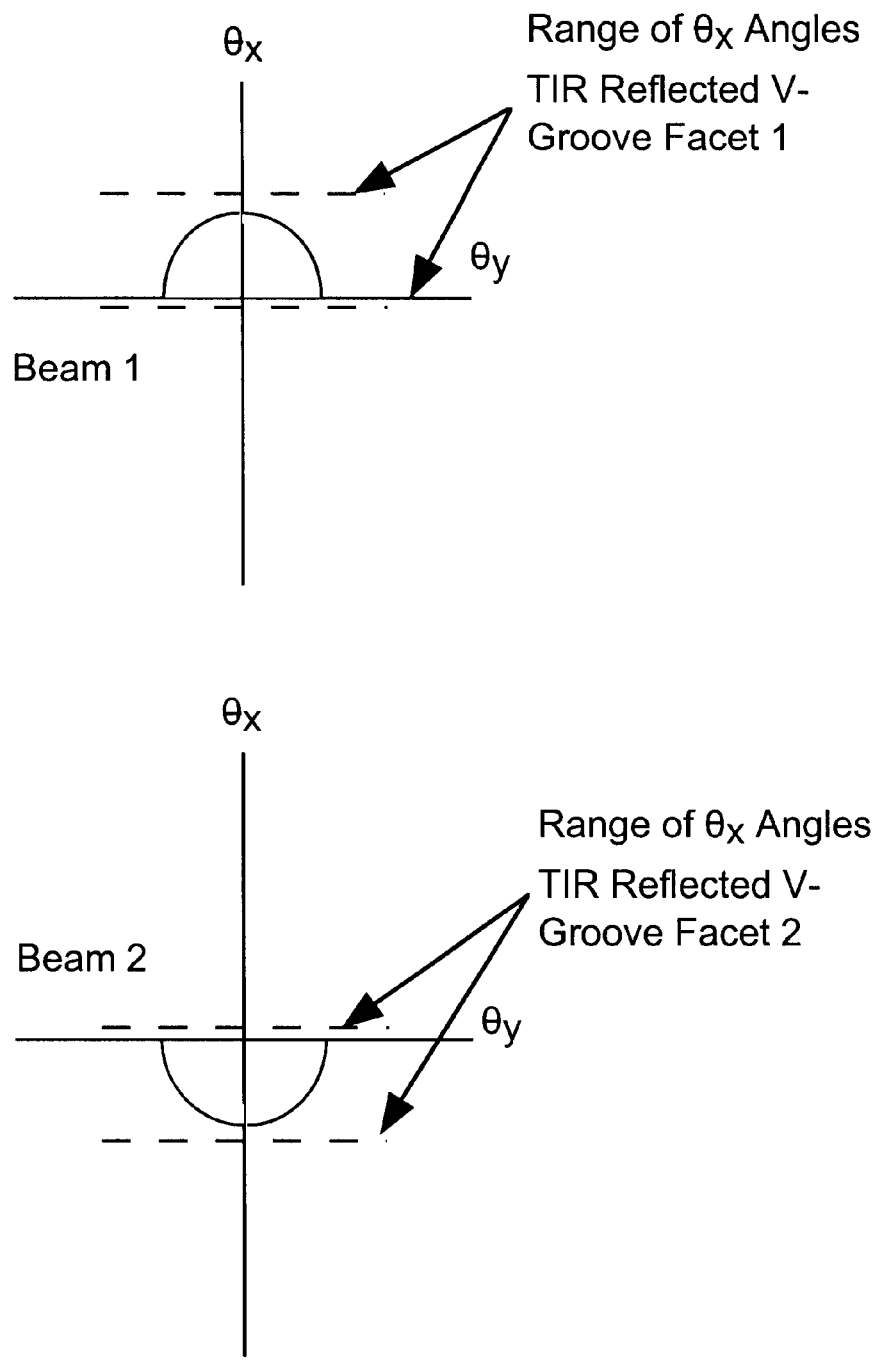
FIG. 3c is an angle space plot of a range of emission angles TIR captured by both facets of the v-groove in FIG. 3b.

To couple beam 1 and beam 2 into a fiber, a double-cladding fiber 60 with a v-groove 62 is placed in the back-focal plane of the second lens 25, and is positioned so that its apex 68 is centered between the two beams 1, 2, as shown in FIGS. 3a and 3b. When the two beams 1, 2 illuminate the two v-groove facets 44, 46 the incidence angles of the beams 1, 2 are compatible with TIR at the facet surfaces (i.e., the beams 1, 2 are totally internally reflected in the inner cladding (not shown) of the double-cladding fiber 60. The angle space plots illustrated in FIG. 3c, showing that the angular distribution of beam 1 is within the TIR angular acceptance range of facet 64, and similarly, the angular distribution of beam 2 is within the TIR angular acceptance range of facet 66, explain this.

Figure 3D:
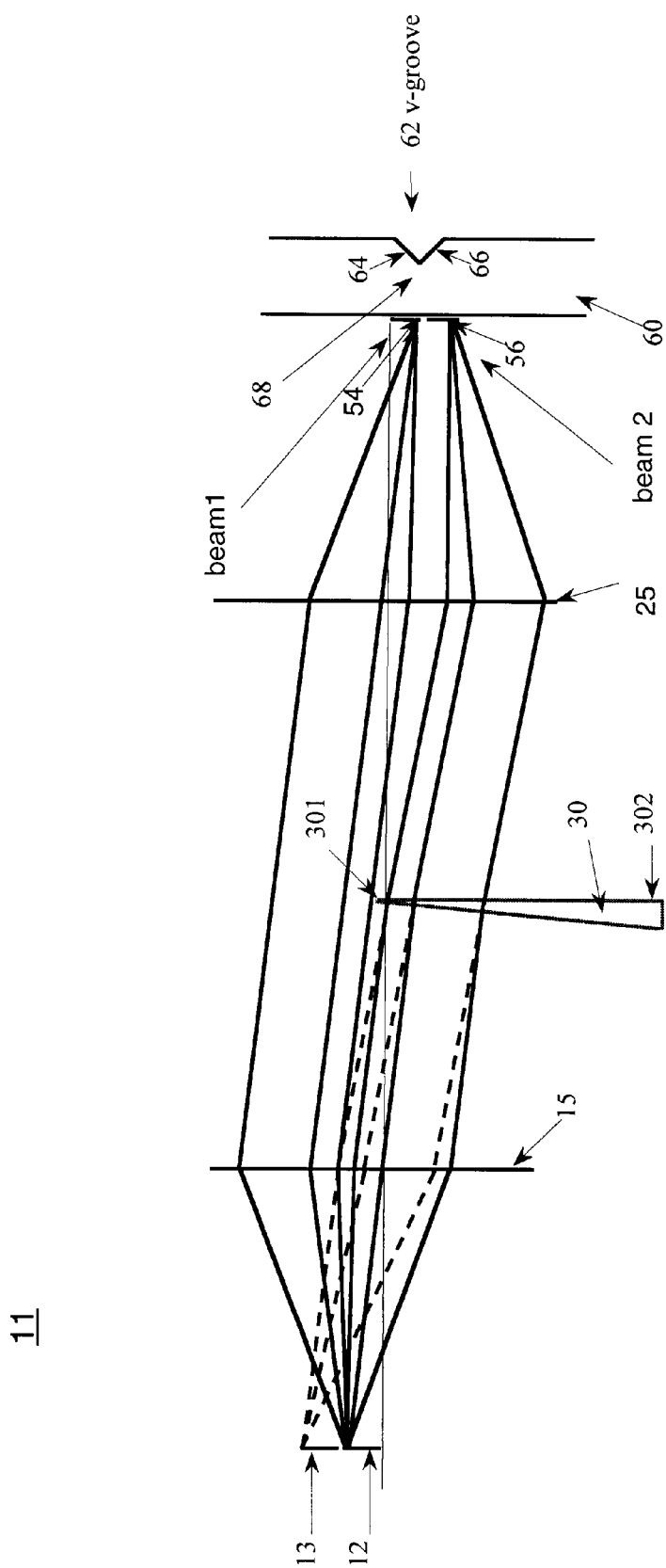
FIG. 3d is a side view of an optical system with a single wedge with incorrect angular divergence properties for TIR capturing.

To further illustrate the properties of the optical system with a wedge 30, the effects of reversing the position of the wedge 30 are shown in FIG. 3d. In FIG. 3d, the narrow end 301 of the wedge 30 is placed near the optical axis 20, so that the negative source angle rays d—f are deflected downward or away from the optical axis 20. This shifts the image 54 produced by those rays d—f downward, as shown in FIG. 3d. Although the optical system 11 in FIG. 3d produces two source images, as was the case for the optical system 10 in FIG. 3a, the angular distributions of the two beams are reversed so that beam 1 contains negative angle $-\theta_y$ rays, while beam 2 contains positive angle $\theta_y$ rays. This angular distribution is not compatible with the TIR angular acceptance range of v-groove facets 64, 66, as shown in the angle space plots shown in FIG. 3e. Consequently, the arrangement of FIG. 3d will result in incomplete reflection of the pump beam by the v-groove 62 and in low coupling efficiency.

Figure 4:
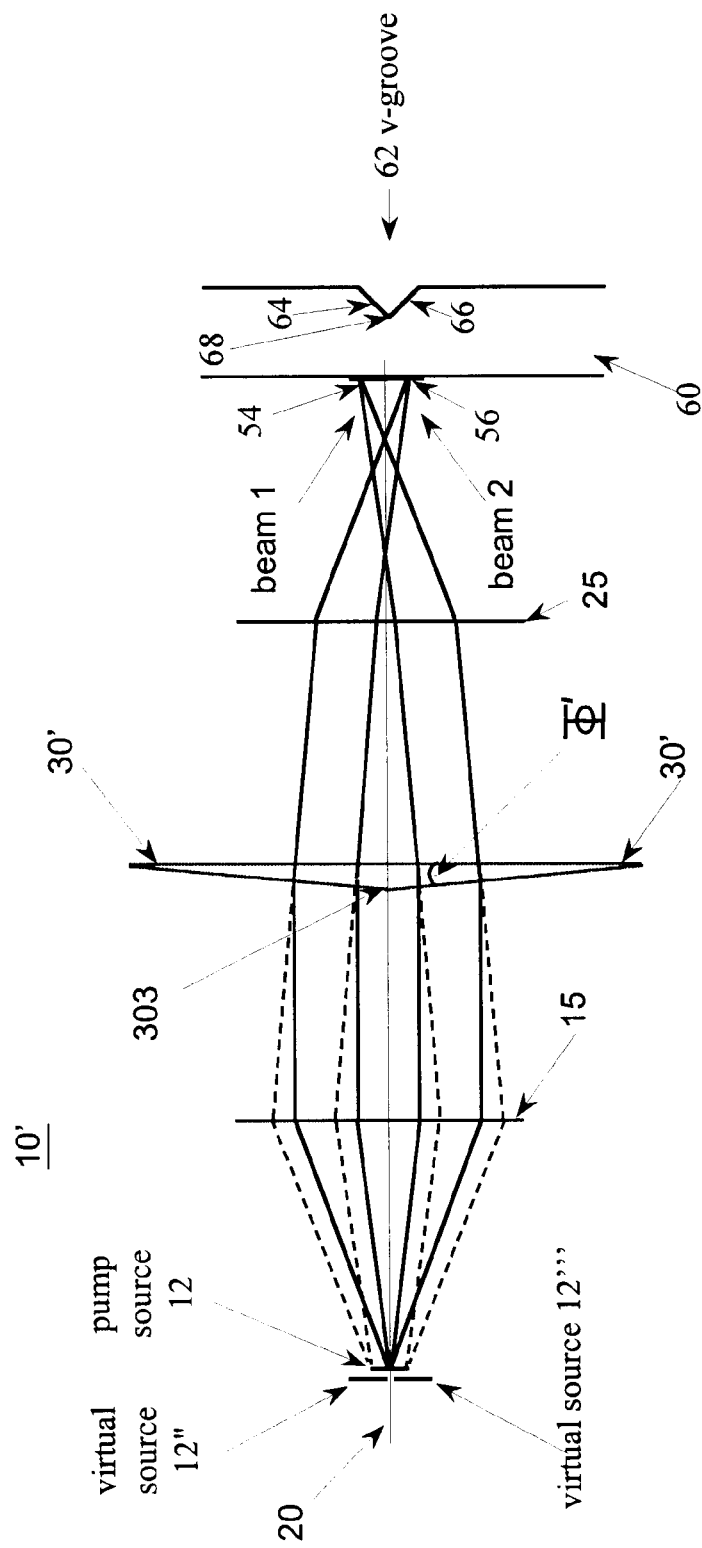
FIG. 4 is a side view of an optical system with two wedges according to an embodiment of the present invention.

Illustrated in FIG. 4 is another method and apparatus according to an embodiment of the present invention. The arrangement shown in FIG. 4 includes a modified wedge-based optical system 10' for v-groove pumping of double cladding fibers. The optical system 10' is a symmetric system that uses two back-to back wedges 30' (which may be fabricated on a single substrate) with the apex 303 of the resulting triangular shaped piece positioned at the optical axis 20. Each of the two wedges 30' shift the parallel rays propagating between the lenses 15, 25 toward the optical axis 20, resulting in an upward shift in the image 54 produced by the negative source angle $-\theta_y$ rays, and a downward shift in the image 56 produced by the positive source angle $\theta_y$ rays. Since both images 54, 56 are shifted, the magnitude of the shift produced by each wedge 30' needs to be only one half of that produced with one wedge 30 (as seen in FIG. 3a) with a wedge angle $\Phi$. As a result, the wedge angle $\Phi'$ required for achieving an image separation equal to that of the single wedge optical system 10 of FIG. 3a is $\Phi'=\Phi/2$.

The angular distributions of the two beams 1, 2 produced by the two wedge optical system 10' illustrated in FIG. 4 are the same as those of the one wedge optical system 10 illustrated in FIG. 3a. Consequently, the angular distributions of the two beams 1, 2 produced by the optical system 10 are compatible with the TIR angular acceptance range of the v-groove 62. Compared with the optical system 10 illustrated in FIG. 3a, the symmetric optical system 10' of FIG. 4 offers the advantage of reducing diffraction and scattering losses, which can occur when the wide end 302 of the wedge 30, seen in FIG. 3a, is placed near the optical axis 20. These types of losses increase when the wide edge 302 of the wedge 30 is chipped or has a rough surface.

Figure 5:
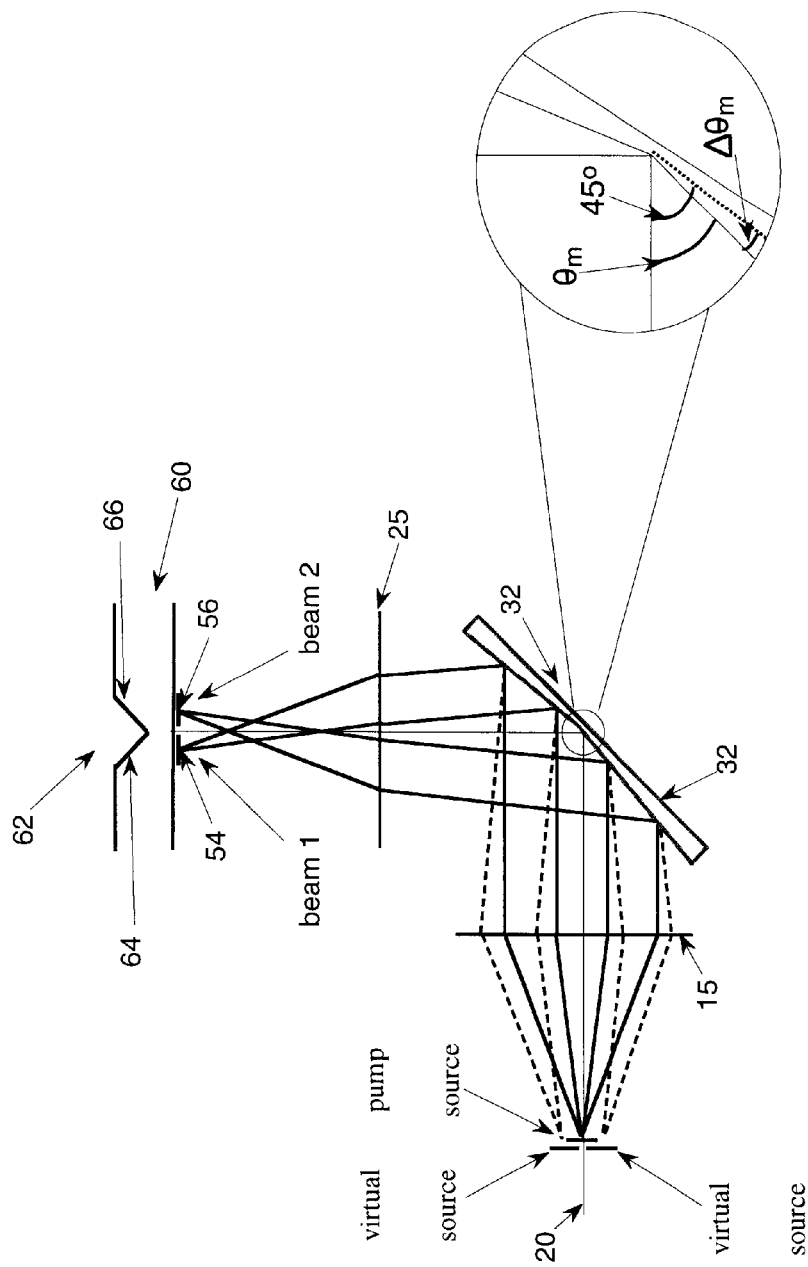
FIG. 5 is a side view of an optical system with two mirrors according to an embodiment of the present invention.

Illustrated in FIG. 5 is another method and apparatus according to an embodiment of the present invention. The arrangement shown is similar in operating principle to that of the two wedge optical system 10'. The optical system 10" shown in FIG. 5 comprises two mirrors 32, both preferably oriented at a mirror angle $\theta_m$ near 45° relative to the optical axis 20. The two mirrors 32 are preferably used to deflect the parallel rays generated by the first lens 15 towards the optical axis 20. Each mirror angle $\theta_m$ may deviate from 45° relative to the optical axis 20 by a small angle of $\pm\Delta\theta_m$ (e.g., $\Delta\theta_m$=1–5 degrees). As in the case of the two wedge optical system 10', this split mirror optical system 10" results in shifting the image 54 produced by the negative source angle $-\theta_y$ rays and the image 56 produced by positive source angle $\theta_y$ rays in directions away from the optical axis 20, resulting in a separation of the two imaged spots 54, 56. The shift $\Delta$ in the image position of both imaged sports 54, 56 is related to the mirror angle $\theta_m$ by $\Delta_s\pm2\theta_m f2$. To produce an image separation equal to that of the single wedge optical system 10 of FIG. 3a (with a wedge angle $\Phi$), the mirror deviation angle $\Delta\theta_m$ needs to be $\Delta\theta_m=\Phi/4$. Both mirrors can be fabricated on the same substrate. An advantage of the mirror-based optical system 10" of FIG. 5 is that it avoids any transmission losses that can occur at the surfaces of the wedges 30.

Figure 6A:
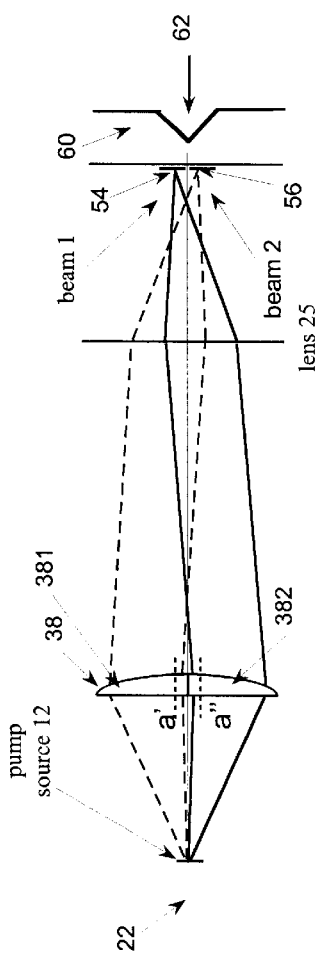
FIG. 6a is a side view of an optical system with a split composite collection lens according to an embodiment of the present invention.
Figure 6B:
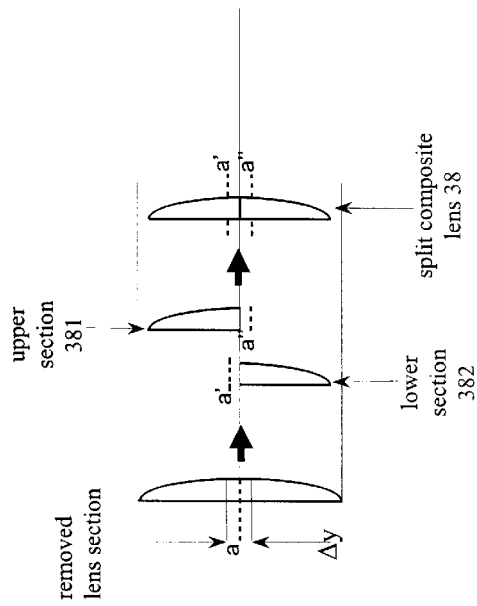

FIG. 6a shows another embodiment of an optical system for angle-selective v-groove pumping of double cladding fibers. The method and apparatus illustrated by FIG. 6a uses a different principle than those described above. A key component of the optical system 10''' is a split composite lens 38, constructed as shown in FIG. 6b. The split composite lens 38 is preferably constructed by cutting a standard circularly symmetric lens (with a focal length f1) and removing a $\Delta y$ wide section of the lens from its center, as illustrated in FIG. 6b. Each of the two resulting lens sections, an upper section 381 and a lower section 382, are then shifted by $\Delta y/2$ toward the center and bonded together to form the split composite lens 38. Each half (i.e., the upper section 381 and the lower section 382) of the split composite lens 38 has its own optical axis, corresponding to the center of the original lens. When the two lens sections 381, 382 are shifted and bonded together their optical axis are displaced relative to each other by $\Delta y$. The shifted optical axis for the upper section 381 is a" and the shifted optical axis for the lower section 382 is a', as shown in FIGS. 6a—6b.

The split composite lens 38 is inserted into the two lens optical system 10''', which is preferably arranged as a telescope, where the second lens 25 is a standard circularly symmetric lens, as shown in FIG. 6a. Pump source rays, shown originating from a source point of the pump source 12, propagating at positive angles $\theta_y$ (dashed lines in FIG. 6a) traverse the upper section of the composite lens 38, whereas negative angle $-\theta_y$ rays (solid lines in FIG. 6a) traverse the lower half of the composite lens 38. For the positive source angle $\theta_y$ rays, the optical axis a" of the composite lens 38 is a distance $\Delta y/2$ below the centerline 22 of the optical system 10''', whereas for negative source angle $-\theta_y$ rays, the optical axis a' of the composite lens 38 is a distance $\Delta y/2$ above the centerline 22. These shifted optical axis a', a" causes the parallel rays generated by the composite lens 38 to be deflected downward at deflection angle $-\Delta\theta_d$ for the positive source angle $\theta_y$ rays and upward at deflection angle $\Delta\theta_d$ for the negative source angle $-\theta_y$ rays. The deflection angle $\Delta\theta_d$ is given by $\Delta\theta_d=\Delta y/2f1$. As in the case of previously discussed optical systems, these shifts in the propagation angle cause a displacement of $-\Delta\theta_d$ f2 (this is negative so as to indicate that the image is flipped relative to the object) in the images formed by the positive rays and the negative rays, forming image spots 54, 56 in the back-focal plane of the second lens 25.

Another way of understanding the operation of the split lens optical system 10''' of FIG. 6a is to consider the fact that the pump source 12 appears to be displaced upwards by $\Delta y/2$ from the optical axis a" of the upper section 381 of the composite lens 38, and downward by $\Delta y/2$ from the optical axis a' of the lower section 382 of the composite lens 38. Therefore, the source beam, formed by the second lens 25 (with a focal length f2), will comprise two beams 1, 2; one beam 2 formed by the pump light collected by the upper section 381, the other beam 1 formed by light collected by the lower section 382. The $y_s=\pm\Delta y/2$ apparent positions of the pump source 12 for the two sections 381, 382 of the composite lens 38 results in imaged spots 54, 56 that are shifted by distances of $\pm M\Delta y/2$ (as before M=f2/f1) from the optical axis or centerline 22 of the second lens 25.

Figure 3E:
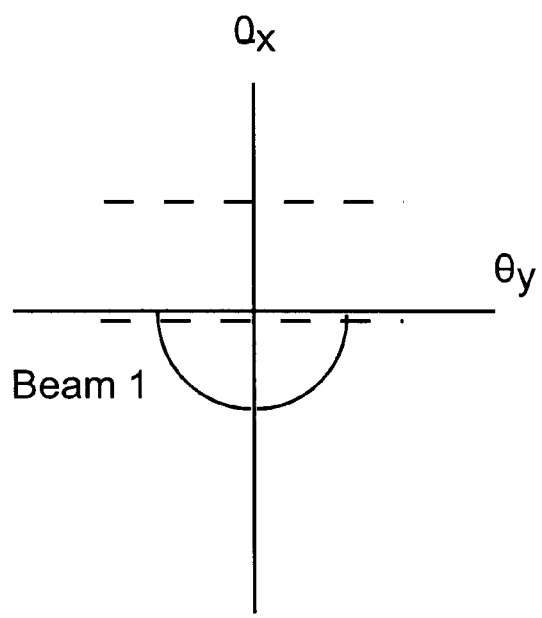
FIG. 3e is an angle space plot illustrating the emission angles of the optical system of FIG. 3d.
Figure 3E:
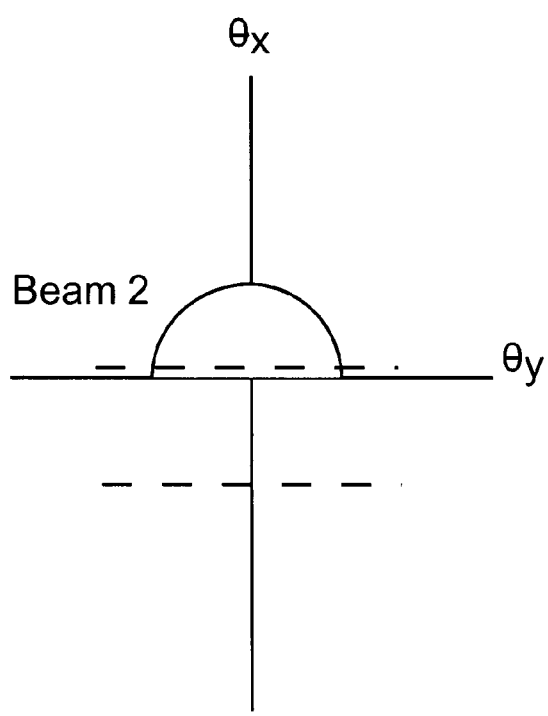

The angular divergence of the imaged spots 54, 56 (and therefore, the angular divergence of the beams 1 and 2) shown in FIG. 6a is the same as that produced by the previously described optical systems (except for the one in FIG. 3e). Specifically, beam 1, produced by the negative angle source rays, preferably contains only rays propagating at positive angles with respect to the image spot 54, and beam 2, produced by the positive angle source rays, preferably contains only rays propagating at negative angles with respect to the image spot 56, making the imaged pump distribution compatible with TIR at the v-groove facets 64, 66.

Figure 7:
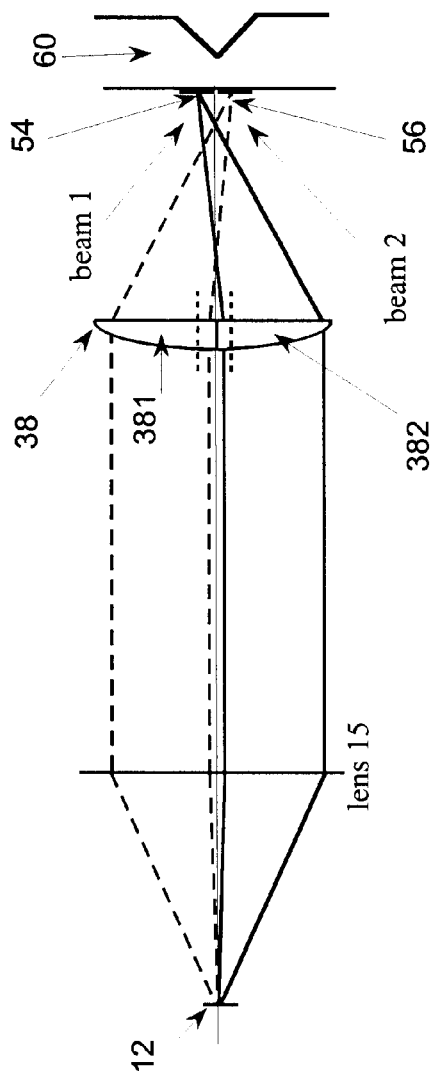
FIG. 7 is a side view of an optical system with a split composite focusing lens according to an embodiment of the present invention.

FIG. 7 shows another embodiment of an optical system for angle-selective v-groove pumping of double cladding fibers. The method and apparatus illustrated by FIG. 7 uses the split composite lens 38 as a focusing lens, in place of the second lens 25. In this optical system 10"", parallel rays traversing the split composite lens 38 are focused into the two image spots 54, 56, each image 54, 56 position coinciding with the position of the optical axis a", a' of the upper section 381 and the lower section 382 of the composite lens 38, respectively. Since the optical axis a", a' of the two lens sections 381, 382 are separated by $\Delta y$, the two imaged spots 54, 56 are separated by the same distance, $\Delta y$. The angular divergence characteristics of the two beams 1, 2 are likewise the same as those of FIG. 6a.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What we claim is:

1. An apparatus for efficiently coupling light from a spatially extended pump source through a v-groove into an optical waveguide, comprising:
   a pump source that emits a source beam when in operation, wherein the source beam comprises a plurality of source rays;
   an optical system, wherein the source beam traverses the optical system and the optical system separates the source beam into a first pump beam and a second pump beam with different angular distributions, the optical system comprising:
      a first lens that collects the source rays of the source beam; and
      a second lens that focuses the collected source rays into the first pump beam and the second pump beam; and
   an optical waveguide, comprising a v-groove, wherein the v-groove comprises a first facet, a second facet and an apex and the v-groove extends into the optical waveguide, and wherein the first pump beam is incident on the first facet and the second pump beam is incident on the second facet and the v-groove couples the first pump beam and the second pump beam into the optical waveguide.

2. The apparatus of claim 1, wherein the optical system further comprises an optical wedge, located between the first lens and the second lens, wherein the optical wedge deflects approximately one-half of the collected source rays to form the first pump beam.

3. The apparatus of claim 2, wherein the first lens and the second lens have an optical axis and wherein the optical wedge includes a narrow end and a wide end and the wide end is placed near the optical axis.

4. The apparatus of claim 3, wherein the optical wedge has a wedge angle $\Phi$ and a refractive index n, and the deflected source rays are deflected by a deflection angle $\Delta\theta = \Phi(n-1)$.

5. The apparatus of claim 1, wherein the optical system further comprises a first optical wedge and a second optical wedge, located between the first lens and the second lens, wherein the first optical wedge deflects approximately one-half of the collected source rays to form the second pump beam and the second optical wedge deflects approximately one-half the collected source rays to form the first pump beam.

6. The apparatus of claim 5, wherein the first lens and the second lens have an optical axis and the first optical wedge and the second optical wedge each have a narrow end and a wide end, wherein the wide end of the first optical wedge and the wide end of the second optical wedge are placed near the optical axis.

7. The apparatus of claim 5, wherein the first optical wedge and the second optical wedge are formed from a single substrate.

8. The apparatus of claim 1, wherein the optical system further comprises a first mirror and a second mirror, located between the first lens and the second lens, wherein the first mirror deflects approximately one-half of the collected source rays to form the second pump beam and the second mirror deflects approximately one-half of the collected source rays to form the first pump beam.

9. The apparatus of claim 8, wherein the first lens has a first optical axis and the first mirror is oriented at an angle $+/-\Delta\theta_m$ from 45° relative to the first optical axis.

10. The apparatus of claim 9, wherein $\Delta\theta_m = 1$ to 5 degrees.

11. The apparatus of claim 8, wherein the first mirror and the second mirror are formed from a single substrate.

12. The apparatus of claim 1, wherein the first lens is a split composite lens.

13. The apparatus of claim 12, wherein the split composite lens deflects the collected source rays to form the first pump beam and the second pump beam.

14. The apparatus of claim 12, wherein the split composite lens comprises an upper section that deflects approximately one-half of the collected source rays to form the second pump beam and a lower section that deflects approximately one half of the collected source rays to form the first pump beam.

15. The apparatus of claim 12, wherein the split composite lens is formed by removing a $\Delta y$ wide section from a lens, to form an upper section and a lower section, and joining the upper portion and the lower portion together at a midline so that the upper portion has an optical axis $\Delta y/2$ below the midline and the lower portion has an optical axis $\Delta y/2$ above the midline.

16. The apparatus of claim 1, wherein the second lens is a split composite lens.

17. The apparatus of claim 16, wherein the split composite lens comprises an upper section that deflects approximately one-half of the collected source rays to form the second pump beam and a lower section that deflects approximately one half of the collected source rays to form the first pump beam.

18. The apparatus of claim 16, wherein the split composite lens is formed by removing a $\Delta y$ wide section from a lens, to form an upper section and a lower section, and joining the upper portion and the lower portion together at a midline so that the upper portion has an optical axis $\Delta y/2$ below the midline and the lower portion has an optical axis $\Delta y/2$ above the midline.

19. The apparatus of claim 1, wherein the pump source is a multimode fiber.

20. The apparatus of claim 1, wherein the pump source is a focused emission from a laser diode bar.

21. The apparatus of claim 1, wherein the optical waveguide is a fiber.

22. The apparatus of claim 21, wherein the fiber is a multiple-cladding fiber comprising an inner cladding, wherein the v-groove extends into the inner cladding 23. The apparatus of claim 22, wherein the multiple-cladding fiber comprises an inner core.

24. The apparatus of claim 23, wherein the inner core is doped with an active dopant.

25. The apparatus of claim 24, wherein the active dopant is Er, Yb, Tm, Nd or Er co-doped with Yb.

26. The apparatus of claim 1, wherein the fiber is an optical fiber amplifier.

27. The apparatus of claim 1, wherein the fiber is an optical fiber laser.

28. The apparatus of claim 1, wherein the source beam comprises an angular divergence and the first pump beam and the second pump beam each comprise one-half the angular divergence of the source beam.

29. The apparatus of claim 1, wherein the first pump beam comprises positive angle rays.

30. The apparatus of claim 1, wherein the second pump beam comprises negative angle rays.

31. The apparatus of claim 1, wherein the angular distribution of the first pump beam is within a totally internal reflection angular acceptance range of the first facet.

32. The apparatus of claim 1, wherein the angular distribution of the second pump beam is within a totally internal reflection angular acceptance range of the second facet.

33. An apparatus for efficiently coupling light from a spatially extended pump source through a v-groove into a fiber, comprising:
   a pump source that emits a source beam when in operation, wherein the source beam comprises a plurality of source rays;
   an optical system, wherein the source beam traverses the optical system and the optical system collects and focuses the source rays of the source beam, the optical system comprising:
      means for separating the source beam into a first pump beam and a second pump beam with different angular distributions; and
   a fiber, comprising a v-groove, wherein the v-groove comprises a first facet, a second facet and an apex and the v-groove extends into the fiber, and wherein the first pump beam is incident on the first facet and the second pump beam is incident on the second facet and the v-groove couples the first pump beam and the second pump beam into the fiber.

34. The apparatus of claim 33, wherein the optical system comprises:
   a first lens that collects the source rays of the source beam; and
   a second lens that focuses the collected source rays into the first pump beam and the second pump beam.

35. The apparatus of claim 34, wherein the means for separating comprises:
   an optical wedge, located between the first lens and the second lens, wherein the optical wedge deflects approximately one-half of the collected source rays to form the first pump beam.

36. The apparatus of claim 35, wherein the first lens and the second lens have an optical axis and wherein the optical wedge includes a narrow end and a wide end and the wide end is placed near the optical axis.

37. The apparatus of claim 35, wherein the optical wedge has a wedge angle $\Phi$ and a refractive index n, and the deflected source rays are deflected by a deflection angle $\Delta\theta = \Phi(n-1)$.

38. The apparatus of claim 34, wherein the means for separating comprises:
   a first optical wedge and a second optical wedge, located between the first lens and the second lens, wherein the first optical wedge deflects approximately one-half of the collected source rays to form the second pump beam and the second optical wedge deflects approximately one-half the collected source rays to form the first pump beam.

39. The apparatus of claim 38, wherein the first lens and the second lens have an optical axis and the first optical wedge and the second optical wedge each have a narrow end and a wide end, wherein the wide end of the first optical wedge and the wide end of the second optical wedge are placed near the optical axis.

40. The apparatus of claim 38, wherein the first optical wedge and the second optical wedge are formed from a single substrate.

41. The apparatus of claim 34, wherein the means for separating comprises:
   a first mirror and a second mirror, located between the first lens and the second lens, wherein the first mirror deflects approximately one-half of the collected source rays to form the second pump beam and the second mirror deflects approximately one-half of the collected source rays to form the first pump beam.

42. The apparatus of claim 41, wherein the first lens has a first optical axis and the first mirror is oriented at an angle $+/-\Delta\theta_m$ from 45° relative to the first optical axis.

43. The apparatus of claim 42, wherein $\Delta\theta_m = 1$ to 5 degrees.

44. The apparatus of claim 41, wherein the first mirror and the second mirror are formed from a single substrate.

45. The apparatus of claim 33, wherein the means for separating comprises
   a split composite lens, wherein the split composite lens deflects the collected source rays to form the first pump beam and the second pump beam.

46. The apparatus of claim 45, wherein the split composite lens comprises an upper section that deflects approximately one-half of the collected source rays to form the second pump beam and a lower section that deflects approximately one-half of the collected source rays to form the first pump beam.

47. The apparatus of claim 45, wherein the split composite lens is formed by removing a $\Delta y$ wide section from a lens, to form an upper section and a lower section, and joining the upper portion and the lower portion together at a midline so that the upper portion has an optical axis $\Delta y/2$ below the midline and the lower portion has an optical axis $\Delta y/2$ above the midline.

48. The apparatus of claim 45, wherein the split composite lens collects the source rays.

49. The apparatus of claim 45, wherein the split composite lens focuses the source rays.

50. The apparatus of claim 33, wherein the pump source is a multimode fiber.

51. The apparatus of claim 33, wherein the pump source is a focused emission from a laser diode bar.

52. The apparatus of claim 33, wherein the fiber is a multiple-cladding fiber comprising an inner cladding, wherein the v-groove extends into the inner cladding 53. The apparatus of claim 52, wherein the multiple-cladding fiber comprises an inner core.

54. The apparatus of claim 53, wherein the inner core is doped with an active dopant.

55. The apparatus of claim 54, wherein the active dopant is Er, Yb, Tm, Nd or Er co-doped with Yb.

56. The apparatus of claim 33, wherein the fiber is an optical fiber amplifier.

57. The apparatus of claim 33, wherein the fiber is an optical fiber laser.

58. The apparatus of claim 33, wherein the source beam comprises an angular divergence and the first pump beam and the second pump beam each comprise one-half the angular divergence of the source beam.

59. The apparatus of claim 33, wherein the first pump beam comprises positive angle rays.

60. The apparatus of claim 33, wherein the second pump beam comprises negative angle rays.

61. The apparatus of claim 33, wherein the angular distribution of the first pump beam is within a totally internal reflection angular acceptance range of the first facet.

62. The apparatus of claim 33, wherein the angular distribution of the second pump beam is within a totally internal reflection angular acceptance range of the second facet.

* * * * *